United States Patent
Uchida et al.

(10) Patent No.: US 11,374,459 B2
(45) Date of Patent: Jun. 28, 2022

(54) MOTOR

(71) Applicant: PANASONIC INTELLECTUAL PROPERTY MANAGEMENT CO., LTD., Osaka (JP)

(72) Inventors: Yasuharu Uchida, Osaka (JP); Kazuo Toya, Osaka (JP); Hirofumi Mizukami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 17/049,522

(22) PCT Filed: Apr. 2, 2019

(86) PCT No.: PCT/JP2019/014650
§ 371 (c)(1),
(2) Date: Oct. 21, 2020

(87) PCT Pub. No.: WO2019/208126
PCT Pub. Date: Oct. 31, 2019

(65) Prior Publication Data
US 2021/0249931 A1 Aug. 12, 2021

(30) Foreign Application Priority Data
Apr. 25, 2018 (JP) .............................. JP2018-084017

(51) Int. Cl.
*H02K 5/24* (2006.01)
*H02K 5/14* (2006.01)
(Continued)

(52) U.S. Cl.
CPC ............... *H02K 5/24* (2013.01); *H02K 5/148* (2013.01); *H02K 5/15* (2013.01); *H02K 5/161* (2013.01);
(Continued)

(58) Field of Classification Search
CPC ............ H02K 5/24; H02K 5/148; H02K 5/15; H02K 5/161; H02K 7/083; H02K 2205/09
(Continued)

(56) References Cited

U.S. PATENT DOCUMENTS

2004/0051411 A1 3/2004 Toya et al.

FOREIGN PATENT DOCUMENTS

| JP | S51-007406 A | 1/1976 |
| JP | H11-018352 A | 1/1999 |

(Continued)

OTHER PUBLICATIONS

International Search Report and Written Opinion issued in International Patent Application No. PCT/JP2019/014650, dated Jul. 2, 2019; with partial English translation.

*Primary Examiner* — Terrance L Kenerly
(74) *Attorney, Agent, or Firm* — McDermott Will & Emery LLP

(57) ABSTRACT

A motor includes a frame in the shape of a bottomed cylinder, a stator housed in the frame, a rotor, an end plate for closing an opening of the frame, and bearings rotatably supporting a rotary shaft of the rotor. The frame has, on its bottom, a bearing holder at the center and ribs extending like rays from the bearing holder radially outward and protruding to the inside of the frame. Each rib has a radially outer end reaching a circumferential wall of the frame.

6 Claims, 8 Drawing Sheets

(51) Int. Cl.
*H02K 5/15* (2006.01)
*H02K 5/16* (2006.01)
*H02K 7/08* (2006.01)

(52) U.S. Cl.
CPC ......... *H02K 7/083* (2013.01); *H02K 2205/09* (2013.01)

(58) Field of Classification Search
USPC .......................................................... 310/51
See application file for complete search history.

(56) References Cited

FOREIGN PATENT DOCUMENTS

| | | | | |
|---|---|---|---|---|
| JP | 2002-204548 | A | 7/2002 | |
| JP | 2007-151210 | A | 6/2007 | |
| JP | 6067057 | B2 * | 1/2017 | ............. F04B 39/14 |
| WO | WO-2014000479 | A1 * | 1/2014 | ............... H02K 5/15 |

* cited by examiner

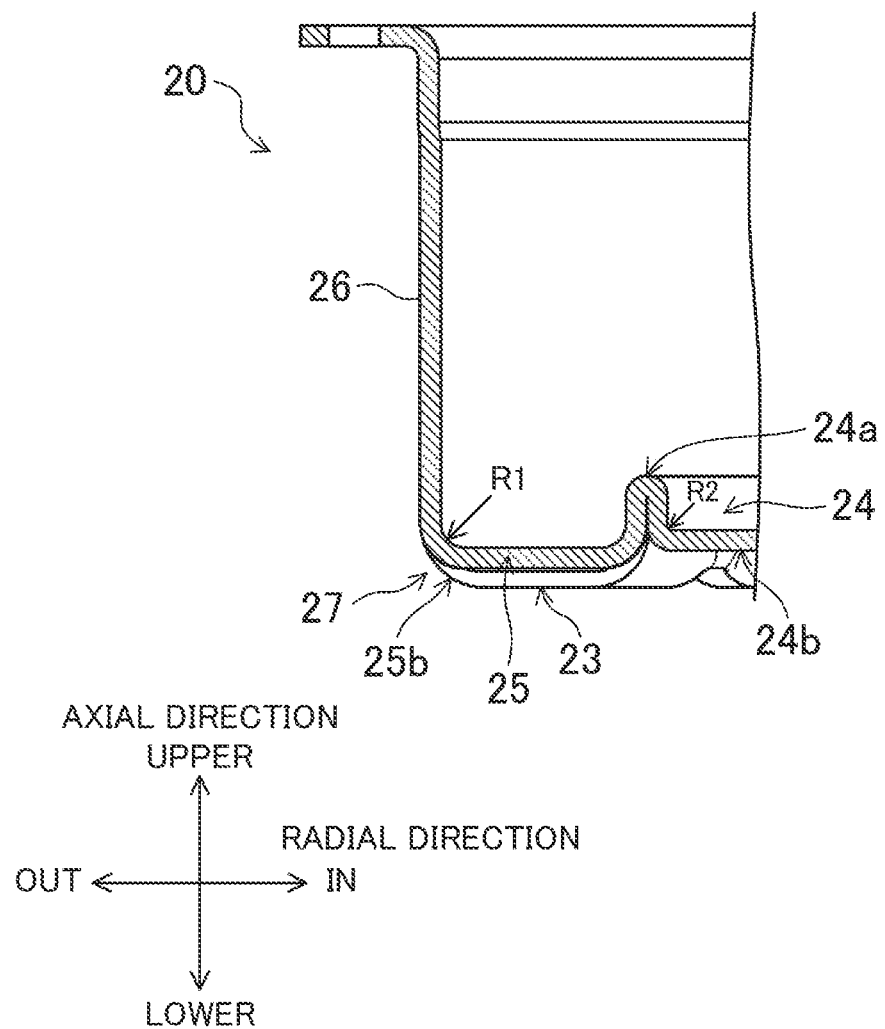

MOTOR

CROSS-REFERENCE OF RELATED APPLICATIONS

This application is the U.S. National Phase under 35 U.S.C. § 371 of International Patent Application No. PCT/JP2019/014650, filed on Apr. 2, 2019, which in turn claims the benefit of Japanese Application No. 2018-084017, filed on Apr. 25, 2018, the entire disclosures of which Applications are incorporated by reference herein.

TECHNICAL FIELD

The present invention relates to a motor, and more particularly to a motor for driving an air compressor.

BACKGROUND ART

Small motors have been used to drive hydraulic units, such as anti-lock brake systems (ABSs), for motor vehicles. As an example of such a motor, for example. Patent Documents 1 and 2 disclose a motor including a rotor including a rotary shaft. The rotor is housed in a yoke that is a frame in the shape of a bottomed cylinder including permanent magnets arranged on the inner surface.

CITATION LIST

Patent Documents

Patent Document 1: Japanese Unexamined Patent Publication No. H11(1999)-018352
Patent Document 2: Japanese Unexamined Patent Publication No, 2002-204548

SUMMARY OF THE INVENTION

Technical Problem

In recent years, downsizing of air compressors mounted on motor vehicles, for example, has been developed. Accordingly, further reduction in the sizes and weights of air compressor driving motors is demanded. In an air compressor driving motors, pressure fluctuations occur in a frame at the drive of a compression mechanism. In accordance with the pressure fluctuations, the bottom of the frame is displaced along the rotary shaft. The frame itself thus needs to have a predetermined strength or more.

However, in the motors according to the background art disclosed in Patent Documents 1 and 2, stress tends to be concentrated at the corners between the bottom and circumferential wall of the frame, With repetition of the displacement described above over a long time, fatigue fracture tends to occur at the corners. In addition, the frame has a relatively flat bottom, the bottom of the frame vibrates at the drive of the motor itself and the pressure fluctuations inside the frame, which causes noise. Such problems can be solved by increasing the rigidity of the frame. However, for example, with an increase in the thickness of the frame, the weight of the motor itself and the costs increase, which are problems.

The present invention has been made in view of the above problems, and an object thereof is to provide a motor including a frame with a greater rigidity and causing less noise at vibration.

Solution to the Problem

In order to achieve the object, a motor according to the present invention includes at least: a frame in a shape of a bottomed cylinder with an open end; a stator housed in, and fixed to, the frame; a rotor facing the stator at a predetermined distance; an end plate having, at a center thereof, a through-hole through which a rotary shaft of the rotor is inserted, and closing an opening of the frame; and a bearing rotatably supporting the rotary shaft. The frame has, on a bottom thereof, a bearing holder holding the bearing at a center thereof, and ribs extending like rays from the bearing holder radially outward and protruding to an inside of the frame. The ribs are arranged at a predetermined interval. Each rib has a radially outer end reaching a circumferential wall of the frame.

This configuration can increase the rigidity of the bottom of the frame and reduce the displacement of the bottom of the frame in the axial direction. This can reduce fatigue failure of the frame. In addition, noise generation from the frame can be reduced.

Advantages of the Invention

The motor according to the present invention can increase the rigidity of the bottom of the frame and reduce the fatigue failure of the frame. In addition, noise generation from the frame can be reduced.

BRIEF DESCRIPTION OF THE DRAWINGS

FIG. 5 is a cross-sectional view taken along line V-V in FIG. 4.

DESCRIPTION OF EMBODIMENT

Embodiment of the present invention will be described in detail with reference to the drawings. The following description of an advantageous embodiment is a mere example in nature, and is not at all intended to limit the scope, applications or use of the present invention.

Figure 1:
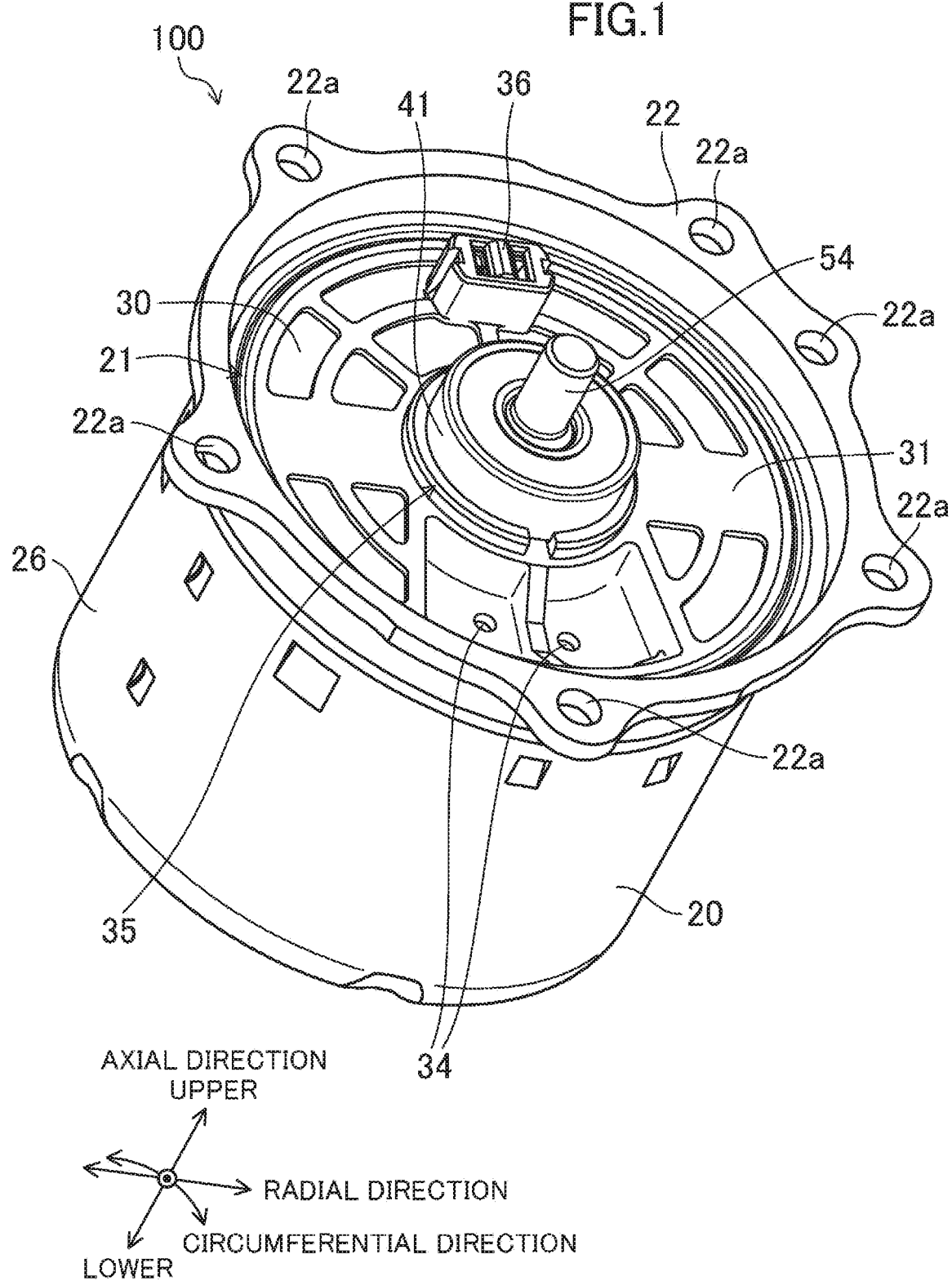
FIG. 1 is a perspective view of a motor according to an embodiment of the present invention as viewed from above.
Figure 2:
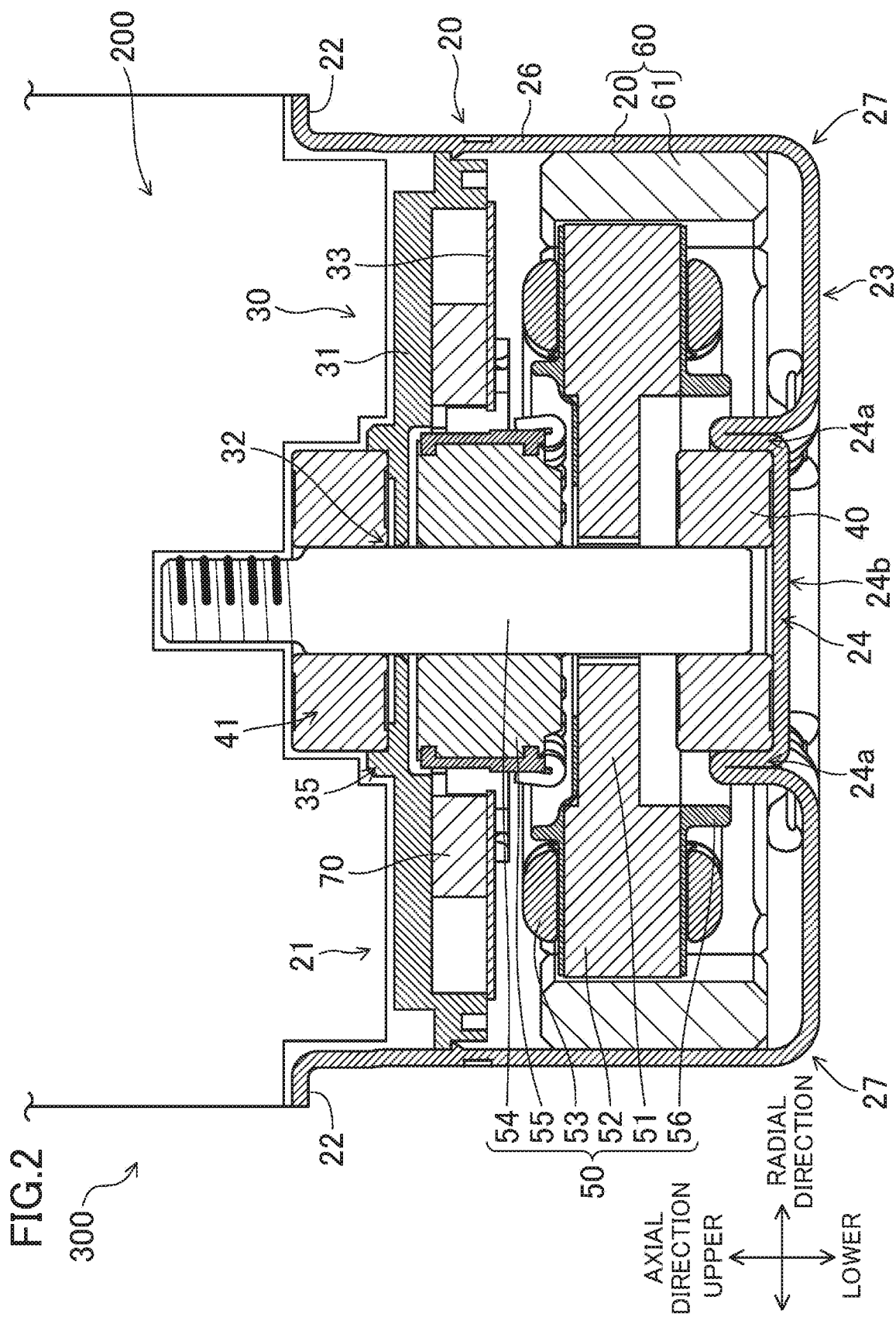
FIG. 2 is a cross-sectional view of an air compressor according to the embodiment of the present invention.
Figure 3:
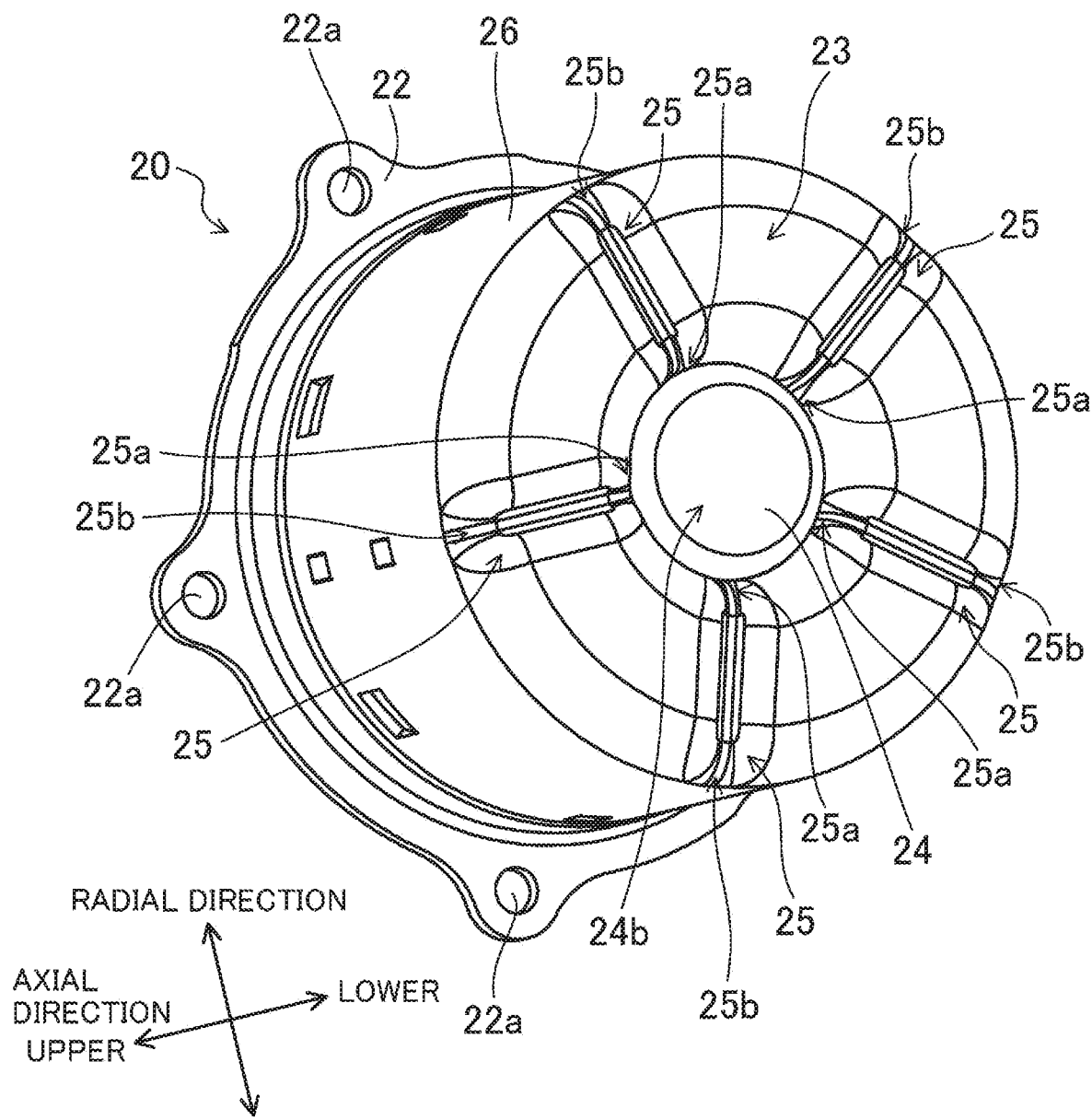
FIG. 3 is a perspective view of a frame as viewed from below.
Figure 4:
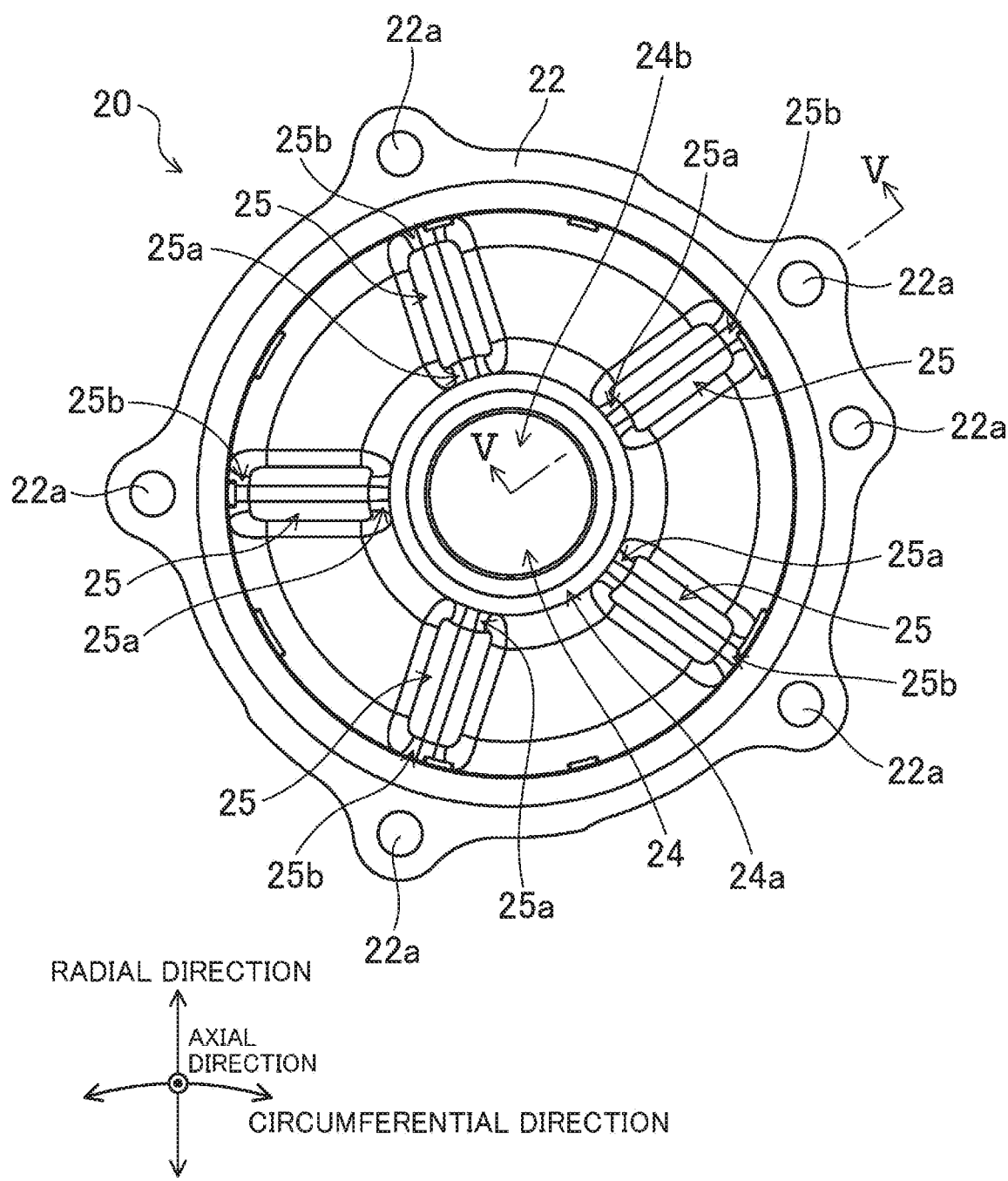
FIG. 4 is a top view of the frame.

(Embodiment)
[Configurations of Air Compressor and Motor]
FIG. 1 is a perspective view of a motor according to this embodiment as viewed from above. FIG. 2 is a cross-sectional view of an air compressor according to this embodiment. FIG. 3 is a perspective view of a frame as viewed from below. FIG. 4 is a top view of the frame. In FIG. 2, only the cross section of a motor 100 is shown and the appearance details and inside of a compression mechanism 200 are not shown for sake of simplicity. In the following description, the longitudinal direction of a rotary shaft 54 that forms a part of a rotor 50 of the motor 100 may be referred to as an "axial" direction. The directions in which the radius and circumference of a frame 20 extend may be referred to as "radial" and "circumferential" directions, respectively. In the axial direction, the compression mechanism 200 may be regarded as being placed at an "upper side" as viewed from the motor 100. The bottom, which is opposite to the upper side, of the frame 20 may be referred to as a "lower side".

As shown in FIGS. 1 to 4, an air compressor 300 includes the motor 100 and the compression mechanism 200. The motor 100 includes the rotary shaft 54 connected to a drive unit (not shown) of the compression mechanism 200. The motor 100 is driven to rotate the rotary shaft 54 so that a cylinder (not shown) in the compression mechanism 200 repeats a series of cycles of suction, compression, and discharge of air to the outside.

The motor 100 includes the frame 20, an end plate 30, bearings 40 and 41, a rotor 50, a stator 60, and brushes 70.

The frame 20 is a metal member in a bottomed semi-cylinder having a flange 22 that protrudes radially outward around an opening 21 at the top of the frame. The flange 22 has screw holes 22*a* in the circumferential direction. Screws (not shown) inserted through the screw holes 22*a* fasten the frame 20 to the compression mechanism 200 to position and fix the motor 100 to the compression mechanism 200. The frame 20 includes, inside the bottom 23, a hearing holder 24 for holding the hearing 40. The bearing holder 24 is defined by a circumferential wall 24*a* protruding to the inside of the frame 20. The hearing 40 is placed on a flat region 24*b*, that is, the inner surface of the frame 20 inside the circumferential wall 24*a*. The flat region 24*b* of the hearing holder 24 enters the frame 20 more inward than the bottom 23 of the frame 20. The frame 20 has a circumferential wall 26 abutting on its bottom 23 at portions which are referred to as "corners 27". On the corners 27 having a greater curvature in the cross section, the stress is less concentrated.

The frame 20 has, on the bottom 23, ribs 25 extending like rays from the bearing holder 24 radially outward and protruding to the inside of the frame 20. The ribs 25 are arranged at a predetermined interval in the circumferential direction, and in a plan view, the screw holes 22*a* are located in a straight line extending radially outward from the ribs 25. The configuration is however not particularly limited thereto. In a plan view, each screw hole may be interposed between adjacent ribs 25 and 25. Each rib 25 has radially inner and outer ends 25*a* and 25*b* extending to reach the circumferential wall 24*a* of the bearing holder 24 and the circumferential wall 26 of the frame 20, respectively. The radially outer end 25*h* of the rib 25 is smoothly connected to the circumferential wall 26 of the frame 20. This respect will be further described.

FIG. 5 is a cross-sectional view taken along line V-V in FIG. 4. Specifically, FIG. 5 shows a curved surface formed by the radially outer end 25*b* of each rib 25 and the circumferential wall 26 of the frame 20.

As shown in FIG. 5, a "gently curved surface" formed by the radially outer end 25*b* of the rib 25 and the circumferential wall 26 of the frame 20 has a predetermined curvature radius R1 in a cross section. The rib 25 and the circumferential wall 26 of the frame 20 are smoothly connected to each other. This configuration reduces the concentration of the stress at the point of the corner 27 of the frame 20 reached by the radially outer end 25*b* of the rib 25.

Note that the gently curved surface may not have the predetermined curvature radius R1 in the cross section as in this embodiment, and may be a part of an elliptical curve. Alternatively, the surface may be a part of a spiral curve. The curved surface formed by the radially outer end 25*b* of each rib 25 and the circumferential wall 26 of the frame 20 may have any shape of cross section, as long as the surface forms a continuously curving line toward the inside of the frame 20 without any sharp corner.

Note that each rib 25 is formed by molding the bottom 23 of the frame 20 so as to be recessed inward.

The end plate 30 is a plate member formed by molding a resin material, and includes a substantially disk-like base 31, a through-hole 32 at the center of the base 31, brush holders 33 on the inner surface of the base 31, vents 34 (see FIG. 1) in the base 31, a bearing holder 35 on the outer surface of the base 31, and an electric wire outlet 36 (see FIG. 1) through which an electric wire for supplying electric power from the outside to the motor 100 is drawn out. For the sake of simplicity, the electric wire led out of the electric wire outlet 36 is not shown in the drawings.

The end plate 30 is positioned with respect to the frame 20, press-fitted into the opening 21 of the frame 20, and placed on the frame 20 so as to cover the opening 21. The frame 20 and the end plate 30 define a space which houses the rotor 50. The rotary shaft 54 is inserted through the through-hole 32 of the end cover 30 and protrudes outward beyond the end plate 30. The rotary shaft 54 is rotatably supported by the bearing 40 in the bearing holder 24 of the frame 20 and the bearing 41 for closing the through-hole 32.

The vents 34 penetrate the base 31 and allows the inside of the frame 20 to communicate with the compression mechanism 200. The vents 34 reduce the pressure applied only to the end plate 30 at the pressure fluctuations during the drive of the air compressor 300 or deformation or damage of the end plate 30. Through the vents 34, the pressure fluctuations of the air generated at the drive of the air compressor 300 is transmitted to the inside of the frame 20. While two vents 34 are open in this embodiment, the configuration is not particularly limited thereto. The number or individual sizes of the vents may be changed as appropriate.

The rotor 50 includes an armature core 51, salient poles 52, armature windings 53, the rotary shaft 54, a commutator 55, and an insulator 56. The armature core 51 includes the salient poles 52 protruding radially outward and arranged at a predetermined interval in the circumferential direction. Each armature winding 53 is wound around a corresponding one of the salient poles 52 with the insulator 56, which is an insulating resin, interposed therebetween. Connected to the commutator 55 is a lead-out wire of the armature winding 53 pulled out of the armature core 51. The rotary shaft 54 is located at the axial center of the rotor 50, penetrates the centers of the armature core 51 and the commutator 55, and is connected to the armature core 51 and the commutator 55. In addition, the rotor 50 has, in a portion protruding outward beyond the end plate 30, a screw groove to fasten the drive unit (not shown) of the compression mechanism 200 and connect the motor 100 and the compression mechanism 200 together.

The stator 60 includes the frame 20 and permanent magnets 61 arranged at a predetermined interval in the circumferential direction on the inner surface of the circumferential wall 26 of the frame 20. Each pair of the permanent magnets 61 adjacent to each other in the circumferential direction have different polarities. The frame 20 also functions as a yoke constituting, together with the permanent magnets 61, a magnetic circuit.

A pair of brushes 70 are made of a carbon brush material, such as graphite, containing a solid lubricant. Each brush is held in a corresponding one of brush holders 33 on the inner surface of the end plate 30 and is pressed by a brush spring (not shown) to the commutator 55.

Now, an operation of the motor 100 will be described. Electric power is supplied from the outside through the electric wire led out of the wire outlet 36 in the end plate 30 to the motor 100. This allows an armature current to flow through the brushes 70 and the commutator 55 to the armature windings 53. Between the armature current flowing through the armature windings 53 and the magnetic flux generated in the stator 60, a torque occurs, whereby the rotary shaft 54 is supported by the bearings 40 and 41 and rotate. In accordance with the rotation of the rotary shaft 54, the contact and separation between the brushes 70 and the commutator 55 are cyclically repeated. With this cycle, the direction of the armature current flowing through the armature windings 53 changes.

[Advantages, Etc.]

As described above, the motor 100 according to this embodiment includes the frame 20, the stator 60, the rotor 50, the end plate 30, and the bearings 40 and 41. The frame 20 is in the shape of the bottomed cylinder having an opening 21 at its top. The stator 60 is housed in, and fixed to, the frame 20. The rotor 50 faces the stator 60 at the predetermined distance. The end plate 30 has, at its center, the through-hole 32, through which the rotary shaft 54 of the rotor 50 is inserted, and closes the opening 21 of the frame 20. The bearings 40 and 41 rotatably support the rotary shaft 54.

The frame 20 has, on its bottom 23, the hearing holder 24 holding the bearing 40 at its center, and ribs 25 extending like rays from the bearing holder 24 radially outward and protruding to the inside of the frame 20.

The ribs 25 are arranged at the predetermined interval. Each rib 25 has the radially outer end 25b reaching the circumferential wall 26 of the frame 20.

The motor 100 with this configuration increases the rigidity of the frame particularly, its bottom 3, and reduces the displacement of the bottom 23 of the frame 20 in the axial direction at the pressure fluctuations generated inside the frame 20 during the drive of the air compressor 300. Accordingly, the frame 20 is less prone to fatigue failure. This respect will be further described.

Figure 6A:
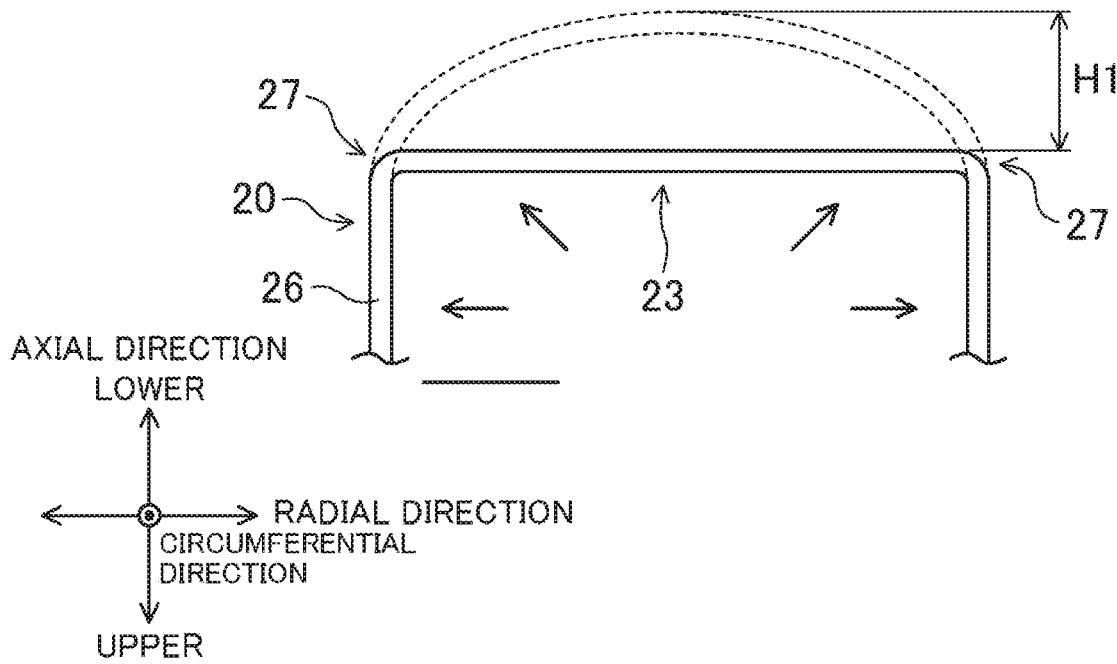
FIG. 6A is a schematic view showing displacement of the bottom of a frame for comparison.
Figure 6B:
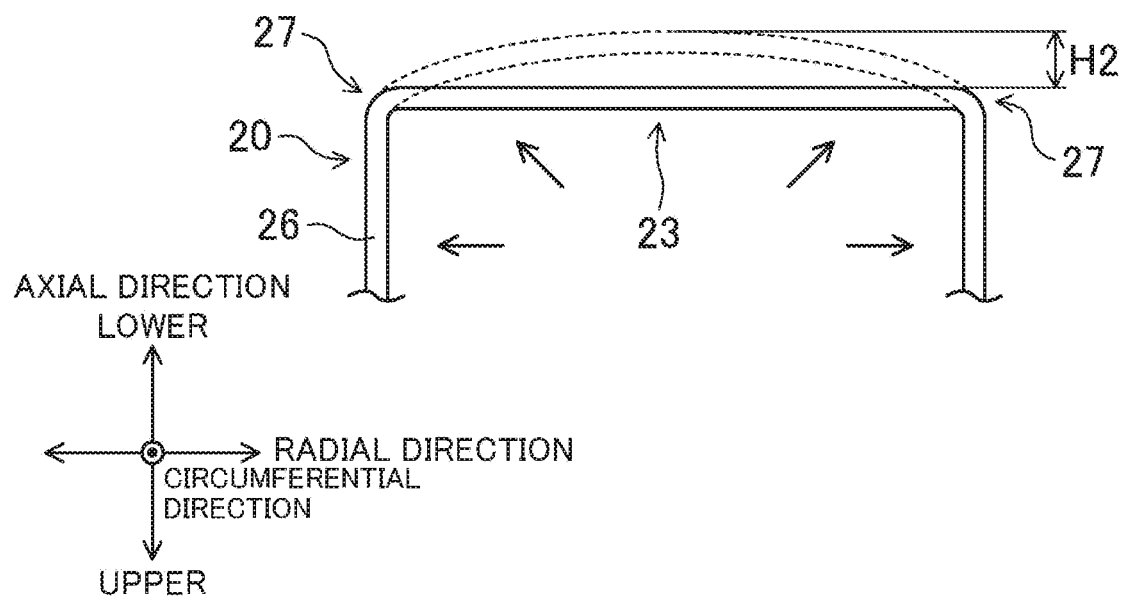
FIG. 6B is a schematic view showing displacement of the bottom of the frame according to the embodiment of the present invention.

FIG. 6A is a schematic view showing displacement of the bottom of a frame for comparison. FIG. 6B is a schematic view showing displacement of the bottom of the frame according to this embodiment. In FIGS. 6A and 6B, the bearing holder 24 is not shown for the sake of simplicity. In addition, the ribs 25 are also not shown in FIG. 6B. The frame 20 shown in FIG. 6A has no ribs 25 on the bottom 23.

As shown in FIG. 6A, in the frame 20 having no ribs 25 and only the continuous flat region on the bottom 3, the bottom 23 is vertically displaced in the axial direction at the occurrence of internal pressure fluctuations. Since the corners 27 serve as fixed ends, the bottom is displaced at a large amount H1.

On the other hand, in this embodiment, the ribs 25 extend like rays on the bottom 23 of the frame 20, and the radially outer ends 25h of the ribs 25 reach the circumferential wall 26 of the frame 20. The circumferential edge of the bottom 23 between the adjacent ribs 25 serves as fixed ends that are displaced in the axial direction. Thus, as shown in FIG. 6B, the bottom 23 of the frame 20 is displaced at a smaller amount H2 than in the case shown in FIG. 6A. In other words, the ribs 25 on the bottom 23 of the frame 20 increase the rigidity of the bottom 23 and causes less displacement.

Accordingly, the frame 20 is less prone to fatigue failure at the corners 27. At periodical displacement of the bottom 23 of the frame 20, the frame 20 vibrates, thereby generating noise. By contrast, this embodiment causes a smaller amount H2 of displacement of the bottom 23 of the frame 20 and noise with a volume reduced in proportional to the amount. There is thus no need to increase the thickness of the frame 20 itself to increase the rigidity of the frame 20, which reduces the weight of the motor 100 and the costs.

The ribs 25 protruding to the inside of the frame 20 reduce the steps at the bottom 23. However, ribs protruding to the outside of the frame 20 also provide the same or similar advantages. In addition, each rib 25 has the radially outer end 25b reaching the circumferential wall 26 of the frame 20. Accordingly, the continuous flat region is not or less formed on the bottom 23 of the flame 20. If formed, such a continuous region is uniformly displaced by the pressure fluctuations. By contrast, this embodiment causes no continuous region and thus reliably reduces the amount of displacement of the bottom 23 of the frame 20.

In this point of view, each rib 25 has the radially inner end 25a reaching the circumferential wall 24a of the bearing holder 24 in one preferred embodiment. Even if a continuous flat region is located around the circumferential wall 24a of the bearing holder 24, the area is smaller than that in the case where a continuous flat region is located near the circumferential edge of the bottom 23. This configuration is less advantageous in reducing the amount of displacement of the bottom 23 than the case where each rib 25 has the radially outer end 25h reaching the circumferential wall 26 of the frame 20.

In one preferred embodiment, each rib 25 has the radially outer end 25b smoothly connected to the circumferential wall 26 of the frame 20. Specifically, the curved surface formed by the radially outer end 25b of the rib 25 and the circumferential wall 26 of the frame 20 has a predetermined curvature radius R1.

This configuration, as described above, can reliably reduce fatigue failure of the frame 20 at the corners 27 with less concentration of stress at the point of each corner 27 reached by the rib 25.

Each rib 25 is formed by recessing the bottom 23 of the frame 20 inward. This allows formation of the ribs 25 by known press processing, for example, without particularly changing the thickness of the frame 20, which reduces an increase in the manufacturing costs of the motor 100.

The motor 100 according to this embodiment is used to drive the air compressor 300. The end plate 30 has an upper surface connected to the compression mechanism 200. The end plate 30 has the vents 34 allowing the inside of the frame 20 to communicate with the compression mechanism 200.

The motor 100 with this configuration reduces the pressure applied only to the end plate 30 at the pressure fluctuations during the drive of the air compressor 300 or deformation or damage of the end plate 30. In addition, the influence of the pressure fluctuations generated inside the frame 20 can be reduced by the ribs 25 on the bottom 23 of the frame 20, which leads to achievement of a highly reliable motor 100.

<Variation>

Figure 7:
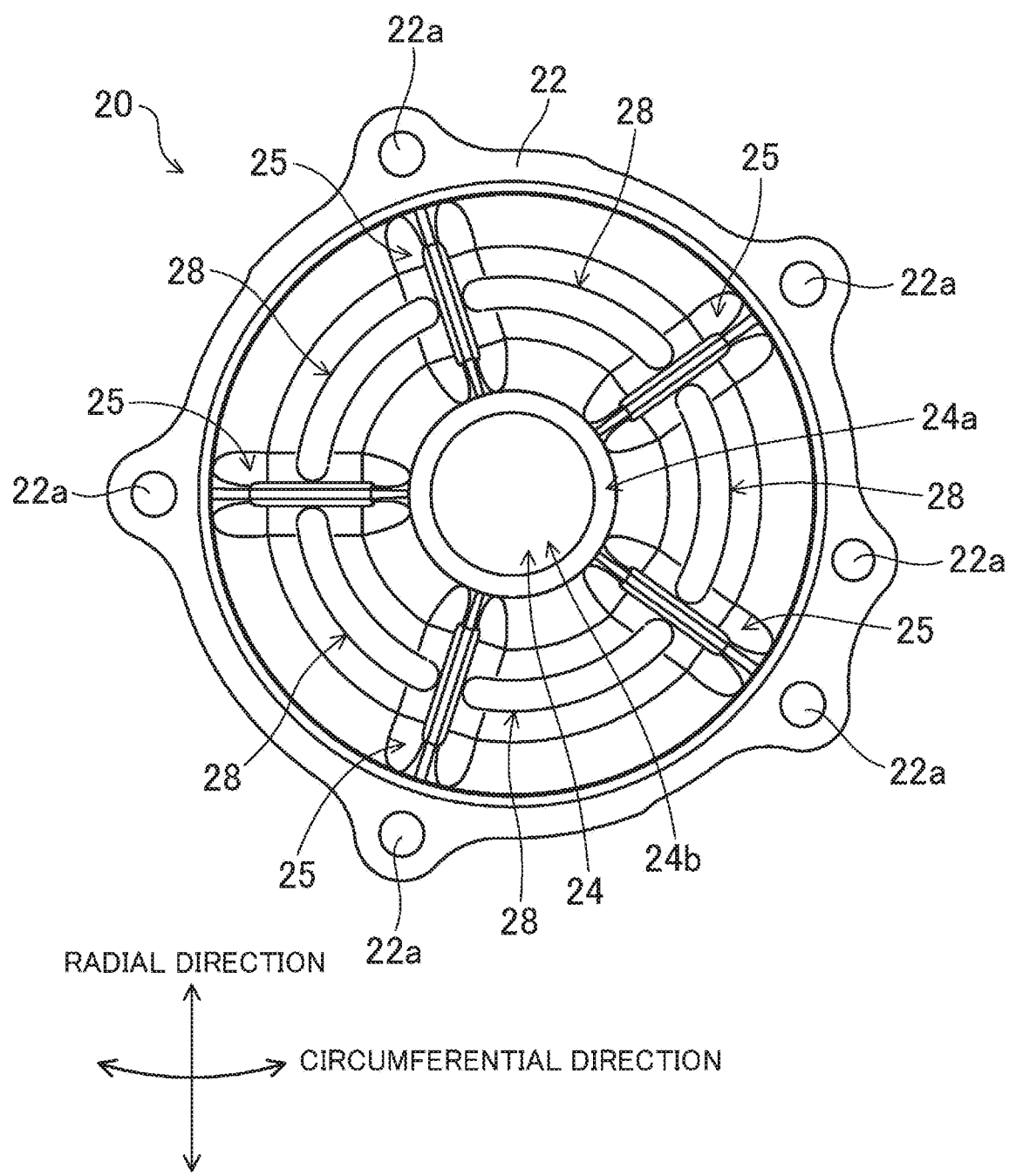
FIG. 7 is a bottom view of a frame according to a variation.

FIG. 7 is a bottom view of a frame according to a variation. The configuration described in this variation differs from that in the embodiment as follows. In a plan view, the frame 20 includes, between the circumferential edge of the bottom 23 and the bearing holder 24, an annular rib 28 coaxial with the bearing holder 24.

The annular rib 28 provided in this manner can further reduce the area of the flat region at the bottom 23 of the frame 20 and thus increase the rigidity against the displacement in the axial direction. This can further reduce the fatigue failure of the frame 20 at the corners 27 and the noise. While the single annular rib 28 is interposed between the corners 27 of the frame 20 and the bearing holder 24 in FIG. 7, the configuration is not limited thereto. The configuration may be changed depending on the size of the frame 20 or the required rigidity of the bottom 23, for example.

(Other Embodiments)

Figure 8:
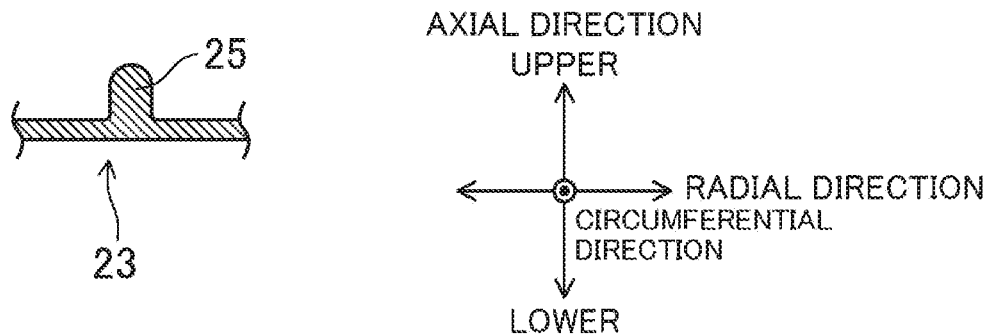
FIG. 8 is a schematic cross-sectional view of the bottom of another frame.

In the embodiment described above, each rib 25 is formed by molding the bottom 23 of the frame 20 so as to be recessed inward. An alternative configuration may be employed. For example, as shown in FIG. 8, the bottom 23 of the frame 20 may have different thicknesses between the rib 25 and the other portion. The motor 100 is applicable to any device other than the air compressor 300, for example, a hydraulic drive device such as an ABS.

INDUSTRIAL APPLICABILITY

The motor according to the present invention can include the frame less prone to deformation or fatigue failure at the occurrence of pressure fluctuations within the frame, and is thus useful as an air compressor driving motor.

DESCRIPTION OF REFERENCE CHARACTERS

20 Frame
21 Opening
23 Bottom of Frame
24 Bearing Holder
24a Circumferential Wall
24b Flat Region
25 Rib
25a Radially Inner End of Rib
25b Radially Outer End of Rib
26 Circumferential Wall of Frame
27 Corner
28 Annular Rib
30 End Plate
34 Vent
40, 41 Bearing
50 Rotor
51 Armature Core
52 Salient Pole
53 Armature Winding
54 Rotary Shaft
55 Commutator
60 Stator
61 Permanent Magnet
70 Brush
100 Motor
200 Compression Mechanism
300 Air Compressor

The invention claimed is:

1. A motor comprising at least: a frame in a shape of a bottomed cylinder with an open end; a stator housed in, and fixed to, the frame; a rotor facing the stator at a predetermined distance; an end plate having, at a center thereof, a through-hole through which a rotary shaft of the rotor is inserted, and closing an opening of the frame; and a bearing rotatably supporting the rotary shaft, the frame having, on a bottom thereof, a bearing holder holding the bearing at a center thereof, and ribs extending like rays from the bearing holder radially outward and protruding to an inside of the frame, the ribs being arranged at a predetermined interval, each rib having a radially outer end reaching a circumferential wall of the frame, wherein each of the ribs has the radially outer end smoothly connected to the circumferential wall of the frame, wherein a curved surface formed by the radially outer end of the rib and the circumferential wall of the frame has a predetermined curvature radius R1, and wherein the bearing holder includes a circumferential wall protruding to an inside of the frame and a flat region positioned inside the circumferential wall, the bearing holder is defined by the circumferential wall to be separated from the other portions in the bottom of the frame, the flat region serves as a portion on which the bearing is placed, and enters the frame more inward than the other portions in the bottom of the frame, and a curved surface formed by the flat region and the flat region has a cross section having a curvature radius R2, and the curvature radius R1 is greater than the curvature radius R2.

2. The motor of claim 1, wherein each of the ribs has a radially inner end reaching a circumferential wall of the bearing holder.

3. The motor of claim 1, wherein each of the rib is formed by recessing the bottom of the frame inward.

4. The motor of claim 1, wherein in a plan view, the frame includes, on the bottom thereof between a circumferential edge of the bottom and the bearing holder, another annular rib coaxial with the bearing holder.

5. The motor of claim 1 which is used for driving an air compressor.

6. The motor of claim 5, wherein
the end plate has an upper surface connected to a compression mechanism of the air compressor, and
the end plate has a vent which allows the inside of the frame to communicate with the compression mechanism.

* * * * *